United States Patent
Alaeddini et al.

(10) Patent No.: US 12,107,892 B1
(45) Date of Patent: Oct. 1, 2024

(54) DATA-BASED GENERATION OF MANAGED POLICIES

(71) Applicant: Amazon Technologies, Inc., Seattle, WA (US)

(72) Inventors: Atiye Alaeddini, Kirkland, WA (US); Homer Strong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 17/213,592

(22) Filed: Mar. 26, 2021

(51) Int. Cl.
*H04L 9/40* (2022.01)

(52) U.S. Cl.
CPC .......... *H04L 63/20* (2013.01); *H04L 63/0263* (2013.01); *H04L 63/0876* (2013.01); *H04L 63/102* (2013.01)

(58) Field of Classification Search
CPC . H04L 63/20; H04L 63/0263; H04L 63/0876; H04L 63/102
See application file for complete search history.

(56) References Cited

U.S. PATENT DOCUMENTS

| | | |
|---|---|---|
| 10,778,691 B1 | 9/2020 | Kissell et al. |
| 2003/0154403 A1* | 8/2003 | Keinsley ............... H04L 63/102 726/8 |
| 2005/0138420 A1 | 6/2005 | Sampathkumar et al. |
| 2008/0201450 A1* | 8/2008 | Bong ...................... H04L 67/14 709/219 |
| 2014/0215604 A1 | 7/2014 | Giblin et al. |
| 2017/0011200 A1* | 1/2017 | Arshad ................. G16H 30/20 |
| 2020/0036704 A1* | 1/2020 | Chu ...................... H04W 12/06 |
| 2021/0203687 A1* | 7/2021 | Rabin ...................... H04L 63/20 |
| 2022/0021657 A1* | 1/2022 | Jayaraman ............ G06F 16/252 |
| 2022/0263835 A1 | 8/2022 | Pieczul et al. |

FOREIGN PATENT DOCUMENTS

KR 2023-0146534 A 10/2023

OTHER PUBLICATIONS

Blei et al.; "Latent Dirichlet Allocation"; Journal of Machine Learning Research; vol. 3; 2003; p. 993-1022.
Chuang et al.; "Termite: visualization techniques for assessing textual topic models"; Proceedings of the Int'l Working Conf. on Advanced Visual Interfaces; 2012; p. 74-77.
(Continued)

*Primary Examiner* — Khoi V Le
(74) *Attorney, Agent, or Firm* — BakerHostetler

(57) ABSTRACT

An identity set may be selected from an identity pool of an identity management service. The identity set may be selected based on a threshold quantity of unnecessary permissions relative to one or more existing managed policies provided by the identity management service. The identity set may be grouped into a plurality of identity subsets. The grouping may be performed based at least in part on services accessed by the identity set. A plurality of candidate policies may be generated, such as by generating, for each identity subset of the plurality of identity subsets, based at least in part on a plurality of policy generation rules, a respective candidate policy. At least one candidate policy of the plurality of candidate policies may be selected as a new managed policy that is provided by the identity management service to users.

18 Claims, 8 Drawing Sheets

(56) References Cited

OTHER PUBLICATIONS

Dhillon; "Co-clustering documents and words using bipartite spectral graph partitioning"; ACM SIGKDD Int'l Conf. on Knowledge Discovery and Data Mining; Aug. 2001; p. 269-274.
Mikolov et al.; "Distributed representations of words and phrases and their compositionality"; In Advances in Neural Information Processing Systems; 2013; p. 3111-3119.
Roberts et al.; "Structural Topic Models for Open-Ended Survey Responses"; American Journal of Political Science; vol. 58 Issue 4; Oct. 2014; p. 1064-1082.
Sievert et al.; "LDAvis: A method for visualizing and interpreting topics"; Proceedings of the Workshop on Interactive Language Learning, Visualization, and Interfaces; 2014; p. 63-70.
"Reviewing and applying recommendations"; https://cloud.google.com/iam/docs/recommender-managing; Oct. 2020; accessed Oct. 21, 2020; 5 pages.
"Enforce least privilege with recommendations"; https://cloud.google.com/iam/docs/recommender-overview; Oct. 2020; accessed Oct. 20, 2020; 13 pages.
Wang et al.; "Exploring the machine learning models behind Cloud IAM Recommender"; https://cloud.google.com/blog/products/identity-security/exploring-the-machine-learning-models-behind-cloud-iam-recommender; Google; Nov. 2019; accessed Sep. 12, 2022; 4 pages.
Mitra et al.; "A Survey or Role Mining"; ACM Computing Surveys; vol. 48 No. 4; Article 50; Feb. 2016; 37 pages.
Kumar et al.; "Mining RBAC Roles under Cardinality Constraint"; Int'l Conf. on Information Systems Security; 2010; p. 171-185.

\* cited by examiner

DATA-BASED GENERATION OF MANAGED POLICIES

BACKGROUND

Access to computing services and resources may be managed through an identity management service, which may allow customers to create identities (e.g., users, user groups, roles, etc.) and allocate permissions to the identities. In some examples, permissions for an identity may be defined by attaching a policy to the identity, and the policy may define permissions that are allocated to the identity. Some identity management services may provide managed policies that are generated by the identity management services and made available to customers. Customers may then decide whether to use a managed policy or create their own custom policy. Custom policies may provide more precise control over the customer's access than managed policies. However, creation of custom policies may require time and effort from customers. In some cases, managed policies may be used by customers to quickly get up and running without the overhead of creating custom policies. However, managed policies that are offered by a service may sometimes be a poor match to the exact set of permissions that are needed for use by a given identity. The principle of least-privilege is a cornerstone of security that specifies that each identity should only have permission to access the services that it needs to perform its specific tasks. A customer may sometimes select a managed policy for a given identity that includes a large quantity of unnecessary permissions that are not used by the identity. This may violate the principle of least privilege and cause security risks. Thus, customers would benefit by the creation of managed policies that are better suited for the usage requirements of identities.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
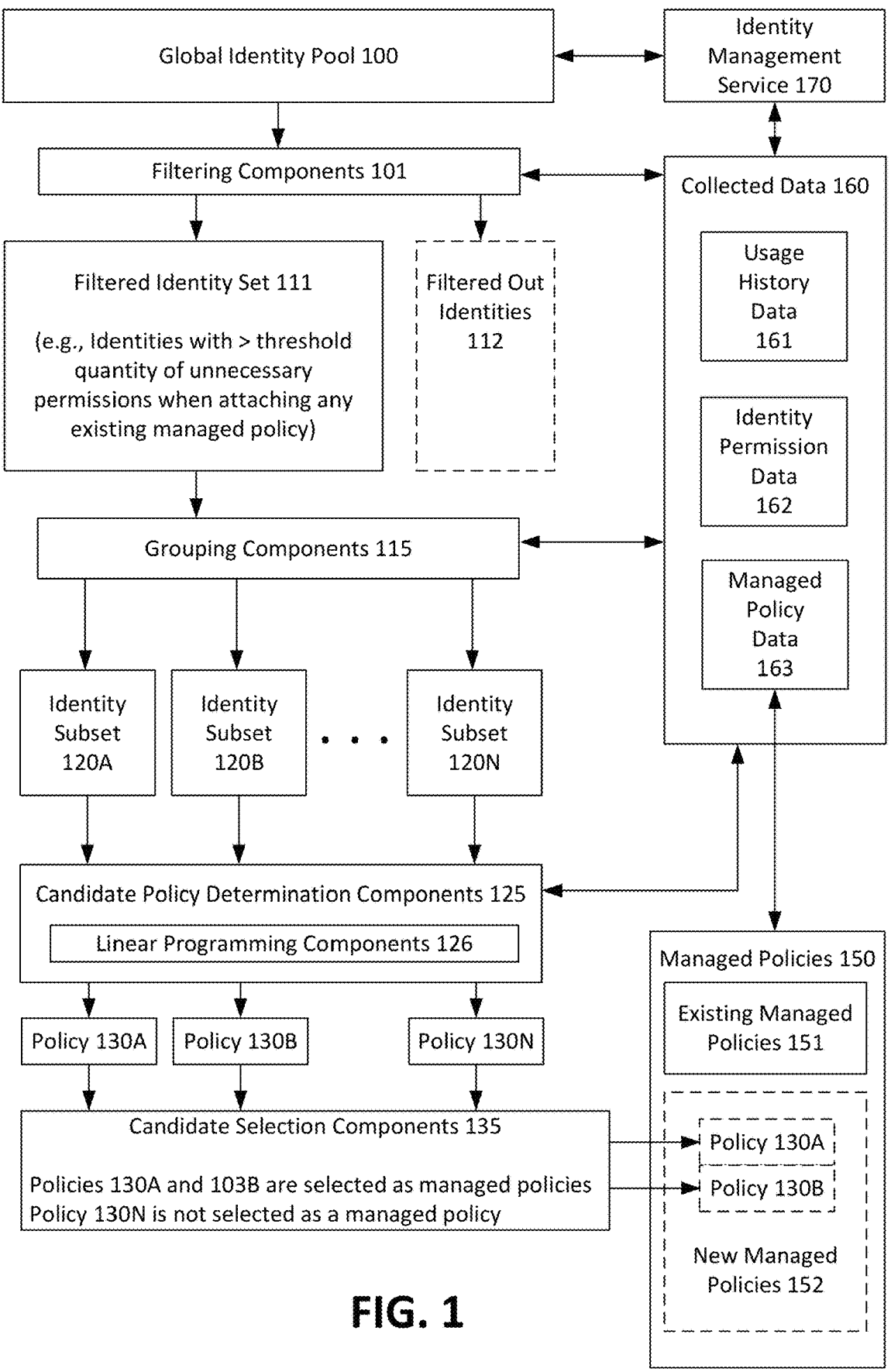
FIG. 1 is a diagram illustrating an example managed policy generation system that may be used in accordance with the present disclosure.

Techniques for data-based generation of managed policies are described herein. In some examples, a group of identities (e.g., users, user groups, roles, etc.) may be managed by an identity management service. The identity management service may provide any number of managed policies for attachment to the identities. The term managed policy, as used herein, refers to a policy that is generated by the identity management service. An identity management service, as that term is used herein, is a service that manages identities by at least allowing customers to create identities (e.g., users, user groups, roles, etc.) and allocate permissions to the identities. Customers of the identity management service may optionally attach the managed policies to identities that are controlled by the customers. The customers may also optionally generate custom policies for attachment to their identities. The managed policies and custom policies may provide various types of access to services and/or resources. The identity management service may gather data regarding the identities and policies, such as usage history data, identity permissions data, and managed policy data. The usage history data may indicate services and resources that are used by each of the identities. The identity permissions data may indicate existing attached policies and permissions that are attached to each of the identities. The managed policy data may include data about managed policies made available by the identity management service, such as the permissions included therein. This and other data may then be used to generate new managed policies for the identity management service as described in detail below.

In some examples, the identity management service may provide one or more existing managed policies. The identity management service may also periodically generate new managed policies, such as to expand the quantity and coverage of managed policies that are offered to customers. The generation of new managed policies may include a number of operations. These operations may include identity filtering, identity grouping (e.g., clustering), candidate policy generation and candidate policy selection. Specifically, the identity filtering operations may include filtering a global identity pool to create a filtered identity set. In some examples, the global identity pool may include all identities managed by the identity management service. In some examples, the identity filtering operations may be performed in order to reduce the quantity of identities that are considered for generating new managed policies, thereby simplifying and reducing the complexity of those calculations. The identity filtering step may include determining the identities within the global identity pool that would most benefit from the creation of new managed policies. In some examples, this may include each identity that would have greater than a threshold quantity of unnecessary permissions if any existing managed policy was individually attached to the identity. In some examples, identities that meet these criteria may be included in the filtered identity set, while the remaining identities (i.e., identities that do not meet these criteria) may be filtered out. An unnecessary permission, as that term is used herein, refers to a permission that has not been used by an identity.

The identity grouping (e.g., clustering) operations may include grouping a set of identities (e.g., the filtered identity set) into a plurality of subsets (e.g., clusters). Similar to the identity filtering operations, the identity grouping operations may also be performed in order to reduce the quantity of identities that are considered for generating new managed policies, thereby simplifying and reducing the complexity of those calculations. Specifically, by grouping a set of identities into smaller subsets, the quantity of identities being considered in each subset is smaller than the quantity of identities in the overall set. In some examples, the set of identities may be grouped based at least in part on services accessed by the set of identities. Thus, for example, identities that access mostly similar services as one another may be grouped together in a same identity subset. By contrast, identities that access mostly different services from one another may be grouped in separate identity subsets. The grouping operations may be performed based on the usage history data, which may indicate services and resources that are used by each of the identities, and which may be gathered by the identity management service. In some examples, the grouping may be performed using a clustering algorithm, such as Latent Drichlet Allocation. Also, in some examples, the clustering algorithm may estimate a probability that each service and each identity is associated with each cluster of a plurality of clusters.

The candidate policy generation operations may include generating at least one candidate policy for each identity subset. In some examples, a candidate policy may be determined based at least in part on a plurality of policy generation rules. The plurality of policy generation rules may include a first rule that a given identity is a covered identity for a given policy only if the given policy includes all services that have been used by the given identity. Additionally, the plurality of policy generation rules may include a second rule that the respective candidate policy will maximize a quantity of covered identities for a respective identity subset. Furthermore, the plurality of policy generation rules may include a third rule that the respective candidate policy cannot exceed a threshold number of services to which to allow access. In some cases, the candidate policies that satisfy these rules may be determined using linear programming calculations.

In some examples, a goal of a new managed policy may be to attempt to find a policy that will reduce as many unnecessary permissions as possible for identities that are managed by the identity management service. However, in some cases, when dealing with a large pool of identities, the calculation of such a policy may be non-convex, meaning that there may be no algorithm that guarantees converging to an optimal solution in linear time. However, by performing the identity filtering and identity grouping operations and by applying the rules described above, calculations for determining new policies may be transformed from a non-convex calculation to a convex calculation, thereby reducing difficulty of the calculations and potentially improving accuracy of the solutions. Specifically, in some cases, if the identity filtering and identity grouping operations described above are not performed, then the pool of identities that are considered in order to generate a new policy may be very large. By contrast, by performing the identity filtering and identity grouping operations described above, the pool of candidates that are considered for generating a candidate policy is reduced, for example from the entire global identity pool to an individual subset of a filtered identity set. This may reduce the complexity of calculation of the candidate policies. Moreover, the identity filtering operations may ensure that the identities being considered have high (e.g., greater than a threshold) quantities of unnecessary permissions, while the policy generation rules may ensure that the candidate policies maximize coverage among those identities. Thus, while it is not guaranteed that candidate policies generated using the techniques described herein will always be policies that reduce unnecessary permissions by the greatest amounts possible, it is expected that the candidate policies may at least serve as suitable approximations of such policies.

The candidate policy selection operations may include examining each generated candidate policy to confirm that the candidate policy will meet selected criteria. In some examples, if a candidate policy meets the criteria, then the candidate policy may be selected for incorporation into the set of managed policies provided by the identity management service. By contrast, if a candidate policy does not meet the criteria, then the candidate policy may not be incorporated into the set of managed policies provided by the identity management service. In some examples, the selected criteria that are employed for the candidate selection process may include an affected identity percentage (AIP) criterion and a reduced unnecessary permission quantity (RUPQ) criterion. Specifically, an affected identity, as that term is used herein, is an identity for which all permissions that have been used by the identity are included in a given candidate policy. In some examples, a calculated AIP may be determined, which is a percentage of identities within the global identity pool that are affected identities for a given candidate policy. Also, in some examples, the AIP criterion may be that, for a given candidate policy, the calculated AIP must exceed a threshold AIP. In some examples, the threshold AIP may be selected based on an AIP of one or more existing managed policies, such as to exceed the AIP of the existing managed policies. Furthermore, in some examples, a calculated RUPQ may be determined, which is a quantity (e.g., an average quantity or total quantity) of reduced unnecessary permissions for the affected identities for a given candidate policy. Also, in some examples, the RUPQ criterion may be that, for a given candidate policy, the calculated RUPQ must exceed a threshold RUPQ. In some examples, the threshold RUPQ may be selected based on an RUPQ of one or more existing managed policies, such as to exceed the RUPQ of the existing managed policies. In some examples, by ensuring that candidate policies that are incorporated into the managed policies meet the policy selection criteria, the candidate policy selection process may ensure that the new managed policies are limited to only those candidate policies that meet selected benchmarks.

FIG. 1 is a diagram illustrating an example managed policy generation system that may be used in accordance with the present disclosure. As shown in FIG. 1, an identity management service 170 manages identities (e.g., users, user groups, roles, etc.) within a global identity pool 100. In some examples, the global identity pool 100 may include all identities managed by the identity management service 170. The identity management service 170 provides managed policies 150 for attachment to identities within the global identity pool 100. The managed policies 150 are policies that are generated by the identity management service 170. Customers of the identity management service 170 may optionally attach the managed policies 150 to identities that are controlled by the customers. The customers may also optionally generate custom policies (not shown in FIG. 1) for attachment to their identities. The managed policies 150 and custom policies may provide various types of access to services and/or resources.

The identity management service 170 gathers and maintains collected data 160, which is data regarding the identities and policies associated with the identity management service 170. In this example, the collected data 160 includes usage history data 161, identity permissions data 162, managed policy data 163 and optionally other data. The usage history data 161 may indicate services and resources that are used by each of the identities in the global identity pool 100. For example, the identity management service 170 may monitor the identities to detect when the identities access services and/or resources, and the identity management service may record associated details, such as a date and time and other details associated with the accessing of these services and/or resources. The identity permissions data 162 may indicate existing attached policies and permissions that are attached to each of the identities in the global identity pool 100. The managed policy data 163 may include data about the managed policies 150, such as the permissions included therein. This and other data may be used to generate new managed policies 152 for the identity management service as described in detail below.

In the example of FIG. 1, the managed policies 150 include existing managed policies 151, which are policies that are generated and provided prior to the creation of new managed policies 152. The example of FIG. 1 illustrates a system that is employed to generate new managed policies 152. In FIG. 1, the new managed policies 152 are shown with dashed lines to indicate that the new managed policies 152 are not included in the managed policies 150 until they are generated using the components shown in FIG. 1 and described below.

In the example of FIG. 1, the new managed policies 152 are generated using identity filtering operations, identity grouping (e.g., clustering) operations, candidate policy generation operations and candidate policy selection operations. Specifically, the identity filtering operations are performed by filtering components 101 and include filtering the global identity pool 100 to create a filtered identity set 111. In some examples, the identity filtering operations may be performed in order to reduce the quantity of identities that are considered for generating new managed policies 152, thereby simplifying and reducing the complexity of those calculations. The identity filtering step may include determining the identities within the global identity pool 100 that would most benefit from the creation of new managed policies 152. In this example, this includes each identity in the global identity pool 100 that would have greater than a threshold quantity of unnecessary permissions if any one of the existing managed policies 151 was individually attached to the identity. Identities that meet these criteria may be included in the filtered identity set 111, while the remaining identities (i.e., identities that do not meet these criteria) may be filtered out into filtered-out identities 112. An unnecessary permission, as that term is used herein, refers to a permission that has not been used by an identity. In some examples, in order to perform the identity filtering operations, the filtering components 101 may access usage history data 161 to determine the permissions that have been used by each identity in the global identity pool 100. The filtering components 101 may then access managed policy data 163 to determine permissions that are provided by each of the managed policies 151. The filtering components 101 may then use the information to determine how many unnecessary permissions would be provided by each one of the existing managed policies to each identity, and the filtering components 101 may compare these determined quantities to the selected threshold. In one specific example, a threshold quantity of twenty unnecessary permissions may be used. Furthermore, in some examples, identities may additionally or alternatively be filtered based on other criteria. For example, in some cases, filtered identity set 111 may be limited only to certain types of accounts, such as accounts that are larger or smaller than selected size thresholds, accounts that are associated with certain types of industries (e.g., banking, pharmaceuticals, etc.), accounts that belong to one or more selected customers, and the like.

The grouping components 115 are employed to perform identity grouping (e.g., clustering) operations. These operations include grouping the filtered identity set 111 into identity subsets 120A-N. Similar to the identity filtering operations, the identity grouping operations may also be performed in order to reduce the quantity of identities that are considered for generating new managed policies 152, thereby simplifying and reducing the complexity of those calculations. Specifically, by grouping filtered identity set 111 into smaller identity subsets 120A-N, the quantity of identities being considered in each of the identity subsets 120A-N is smaller than the quantity of identities in the overall filtered identity set 111. In some examples, the filtered identity set 111 may be grouped based at least in part on services accessed by the filtered identity set 111. Thus, for example, identities that access mostly similar services as one another may be grouped together in a same identity subset. By contrast, identities that access mostly different services from one another may be grouped in separate identity subsets. The grouping operations may be performed based on the usage history data 161, which may indicate services and resources that are used by each of the identities that are being grouped. In some examples, the grouping may be performed using a clustering algorithm, such as Latent Drichlet Allocation. Also, in some examples, the clustering algorithm may estimate a probability that each service and each identity is associated with each cluster of a plurality of clusters.

The candidate policy determination components 125 are employed to generate at least one candidate policy for each identity subset 120A-N. If identity filtering and/or identity grouping are not performed, then at least one candidate policy may be generated for the entire global identity pool 100 and/or for the entire filtered identity set 111. In the example of FIG. 1, the candidate policies include policies 130A-N. Specifically, policy 130A is a respective candidate policy for identity subset 120A. Policy 130B is a respective candidate policy for identity subset 120B. Policy 130N is a respective candidate policy for identity subset 120N.

Figure 2:
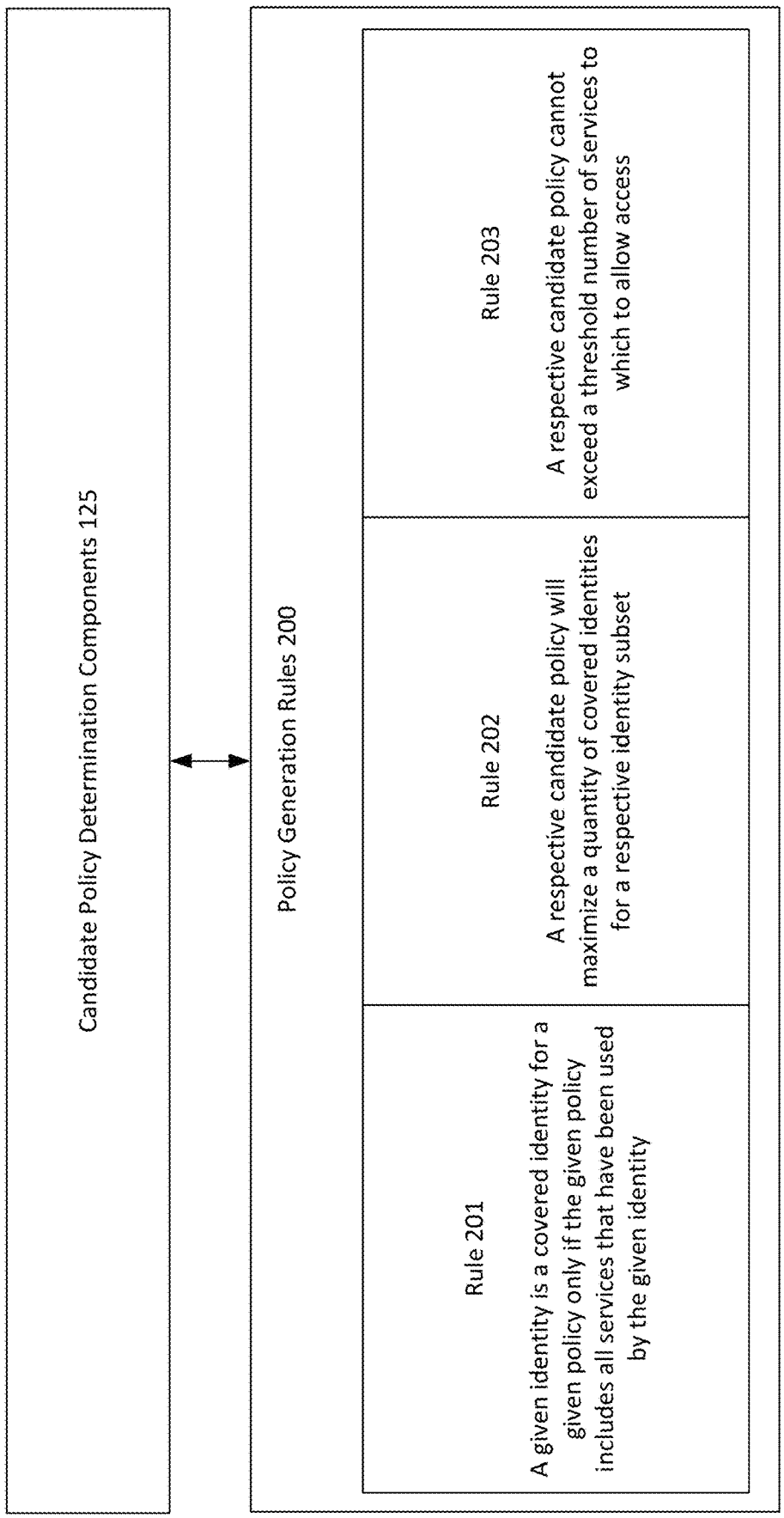
FIG. 2 is a diagram illustrating example policy generation rules that may be used in accordance with the present disclosure.

In some examples, the candidate policies may be determined based at least in part on a plurality of policy generation rules. Referring now to FIG. 2, some example policy generation rules will now be described in detail. As shown in FIG. 2, policy generation rules 200 include rules 201-203. In this example, rule 201 specifies that a given identity is a covered identity for a given policy only if the given policy includes all services that have been used by the given identity. Additionally, rule 202 specifies that a respective candidate policy will maximize a quantity of covered identities for a respective identity subset. Furthermore, rule 203 specifies that a respective candidate policy cannot exceed a threshold number of services to which to allow access. In some cases, the candidate policies that satisfy policy generation rules 200 may be determined using linear programming calculations, for example by linear programming components 126.

As described above, in some examples, a goal of a new managed policy may be to attempt to find a policy that will reduce as many unnecessary permissions as possible for identities that are managed by the identity management service 170. However, in some cases, when dealing with a large pool of identities (e.g., global identity pool 100), the calculation of such a policy may be non-convex, meaning that there may be no algorithm that guarantees converging to an optimal solution in linear time. However, by performing the identity filtering and identity grouping operations and by applying the policy generation rules 200 described above, calculations for determining new policies may be transformed from a non-convex calculation to a convex calculation, thereby reducing difficulty of the calculations and potentially improving accuracy of the solutions. Specifically, in some cases, if the identity filtering and identity grouping operations described above are not performed, then the pool of identities that are considered in order to generate a new policy may be very large. By contrast, by performing the identity filtering and identity grouping operations described above, the pool of candidates that are considered for generating a candidate policy is reduced, for example from global identity pool 100 to individual subsets (e.g., identity subsets 120A-N) of filtered identity set 111. This may reduce the complexity of calculation of the candidate policies. Moreover, the identity filtering operations may ensure that the identities being considered have high (e.g., greater than a threshold) quantities of unnecessary permissions, while the policy generation rules may ensure that the candidate policies maximize coverage among those identities. Thus, while it is not guaranteed that candidate policies will always be policies that reduce unnecessary permissions by the greatest amounts possible, it is expected that the candidate policies may at least serve as suitable approximations of such policies.

Figure 3:
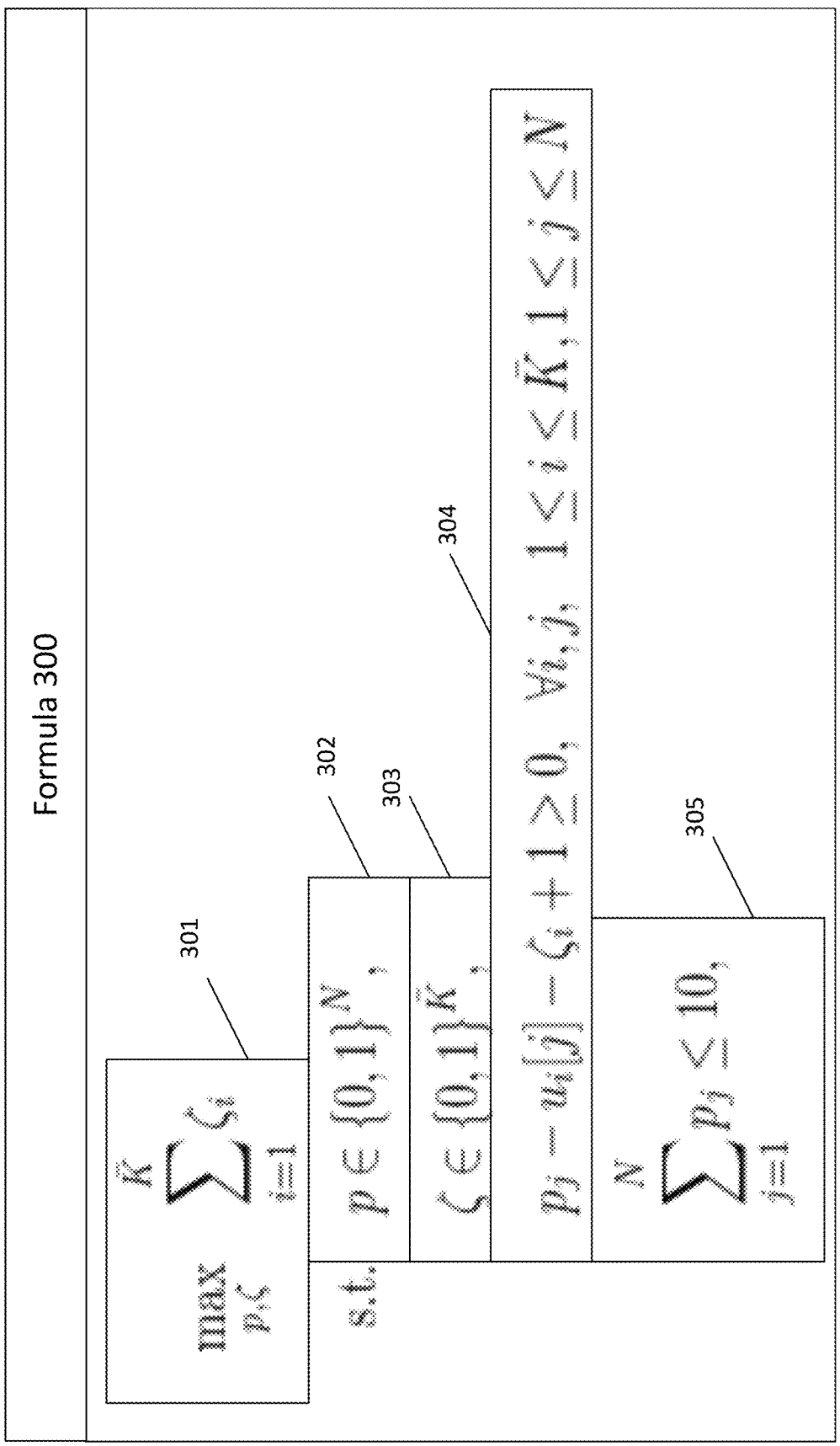
FIG. 3 is a diagram illustrating an example formula for determining a candidate policy that may be used in accordance with the present disclosure.

Referring now to FIG. 3, an example of a formula 300 for determining a candidate policy will now be described in detail. In formula 300, the letter (p) represents a given policy. Additionally, the letter (i) represents a given identity. The letter (K) represents the quantity of all identities in a global identity pool, such as global identity pool 100 of FIG. 1. In formula 300, the letter (K) with an overbar, referred to hereinafter as K-overbar, represents the quantity of identities being considered for generation of the respective candidate policy. For formula 300, it is assumed that K-overbar is less than (K), meaning that not all of the identities in the global identity pool are being considered. For example, for scenarios in which identity filtering is performed but identity grouping is not performed, K-overbar may represent the entire quantity of identities in the filtered identity set 111 (which is less than the quantity of identities in the global identity pool 100). By contrast, for scenarios in which both identity filtering and identity grouping are performed, K-overbar may represent the quantity of identities in the respective identity subset for which the candidate policy is being generated. For example, for generation of policy 130A for identity subset 120A, K-overbar may represent the quantity of identities in identity subset 120A. Furthermore, the letter (j) represents a given service, while the letter (N) represents a given quantity of services. The indication (s.t.) in formula 300 means "such that."

In formula 300, the constraint 302 indicates that policy (p) relates to a vector that has a value of zero or one for each service (j) in the quantity of services (N). Specifically, (p) has a value of one if the policy includes the service, while (p) has a value of zero if the policy doesn't include the service. This means that, in constraint 304, the notation of p-subscript-j will equal one if the given policy (p) includes a given service (j). By contrast, the notation of p-subscript-j will equal zero if the given policy (p) does not include the given service (j).

Additionally, the constraint 303 indicates that Zeta relates to a vector that has a value of zero or one for each identity (i) in the quantity of identities (K-overbar). Specifically, Zeta has a value of one if the identity is covered by the given policy, while Zeta has a value of zero if the identity is not covered by the given policy. This means that, in constraint 304, the notation of Zeta-subscript-i will equal one if a given identity (i) is covered by a given policy (p). By contrast, Zeta-subscript-i will equal zero if a given identity (i) is not covered by the given policy (p).

The constraint 304 includes a first notation, which is p-subscript-i. Additionally, the constraint 304 includes a second notation, which is u-subscript-i followed by the letter j (with the letter j in brackets). The second notation will equal one if the given service (j) has been used by the given identity (i). By contrast, the second notation will equal zero if the given service (j) has not been used by the given identity (i). The upside-down A in constraint 304 means "for all", such that constraint 304 must be satisfied for all identities from 1 to K-overbar and for all services from 1 to N. Thus, the inclusion of constraint 304 in formula 300 ensures that a given identity (i) is covered by a given policy (p) only if the given policy (p) includes all services that have been used by the given identity (i). This is reflected in rule 201, which specifies that a given identity is covered by a given policy only if the given policy includes all permissions that have been used by the given identity.

The formula 300 also includes a constraint 305, which ensures that a given policy (p) cannot allow access to more than a threshold number of services. This is reflected in rule 203, which specifies that a respective candidate policy cannot exceed a threshold number of services to which to allow access. In the example of FIG. 3, constraint 305 indicates that the threshold number of services is ten. It is noted that this is merely an example, and that the threshold may be set to any number of services. It is noted, however, that the use of a smaller threshold number of services (such as ten) may be advantageous because it may reduce the complexity of the calculations for formula 300. Additionally, the use of a smaller threshold number of services (such as ten) may also be advantageous because it may result in generation of candidate policies that include fewer permissions, thereby potentially improving security.

Finally, in formula 300, constraint 301 indicates that the candidate policy that is generated will be the policy (p) that maximizes a quantity of covered identities for the considered quantity of identities (K-overbar). In formula 300, this is achieved by finding the policy that maximizes Zeta-subscript-i. The constraint 301 is reflected in rule 202, which specifies that a respective candidate policy will maximize a quantity of covered identities for a respective identity subset.

Referring back to FIG. 1, it is shown that the candidate policies, which in this example include policies 130A-N, are provided to candidate selection components 135. The candidate selection components 135 may select one or more of the candidate policies for inclusion in the managed policies 150. Additionally, the candidate selection components 135 may select one or more other of the candidate policies not to include in the managed policies 150. In the example of FIG. 1, candidate selection components 135 select policies 130A and 130B for inclusion in the managed policies 150. Additionally, in the example of FIG. 1, candidate selection components 135 select policy 130N not to be included in the managed policies 150. In some examples, in order to make these selections, the candidate selection components 135 may examine each of the candidate policies to confirm that the candidate policy meets selected criteria. In some examples, if a candidate policy meets the criteria, then the candidate policy may be selected for incorporation into the managed policies 150 provided by the identity management service 170. By contrast, if a candidate policy does not meet the criteria, then the candidate policy may not be incorporated into the set of managed policies 150 provided by the identity management service 170.

Figure 4:
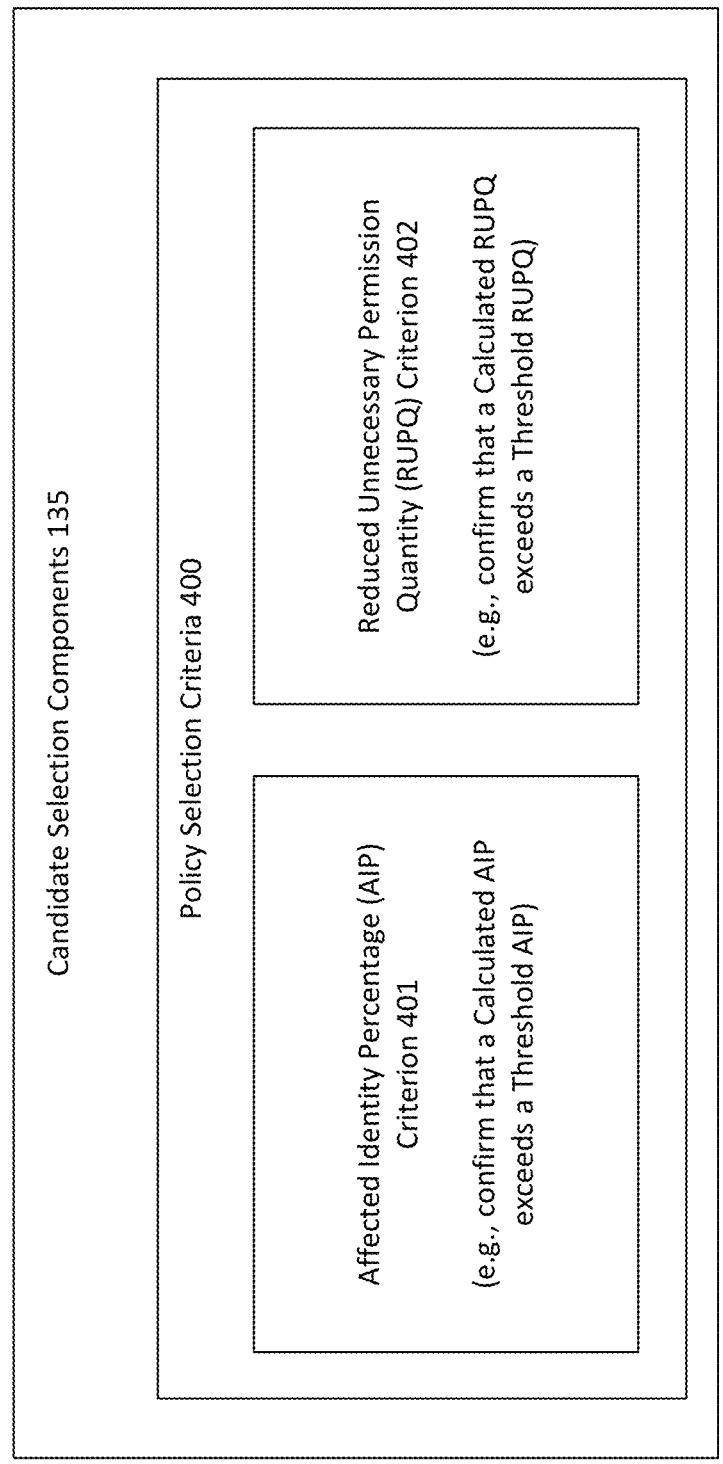
FIG. 4 is a diagram illustrating example policy selection criteria that may be used in accordance with the present disclosure.

Referring now to FIG. 4, some examples of policy selection criteria 400 will now be described in detail. In the example of FIG. 4, the policy selection criteria 400 that are employed for the candidate selection process may include an affected identity percentage (AIP) criterion 401 and a reduced unnecessary permission quantity (RUPQ) criterion 402. Specifically, an affected identity, as that term is used herein, is an identity for which all permissions that have been used by the identity are included in a given candidate policy. In some examples, a calculated AIP may be determined, which is a percentage of identities within the global identity pool that are affected identities for a given candidate policy. Also, in some examples, the AIP criterion 401 may be that, for a given candidate policy, the calculated AIP must exceed the threshold AIP. In some examples, the threshold AIP may be selected based on an AIP of one or more existing managed policies, such as to exceed the AIP of the existing managed policies. Furthermore, in some examples, a calculated RUPQ may be determined, which is a quantity (e.g., an average quantity or total quantity) of reduced unnecessary permissions for the affected identities for a given candidate policy. Also, in some examples, the RUPQ criterion 402 may be that, for a given candidate policy, the calculated RUPQ must exceed the threshold RUPQ. In some examples, the threshold RUPQ may be selected based on an RUPQ of one or more existing managed policies, such as to exceed the RUPQ of the existing managed policies. In some cases, different weights may be assigned to different types of unnecessary permissions, and criterion 402 may be modified to require one or more selected weighted thresholds of reduced unnecessary permissions. In some examples, by ensuring that candidate policies that are incorporated into the managed policies 150 meet the policy selection criteria 400, the candidate policy selection process may ensure that the new managed policies 152 are limited to only those candidate policies that meet selected benchmarks.

Figure 5:
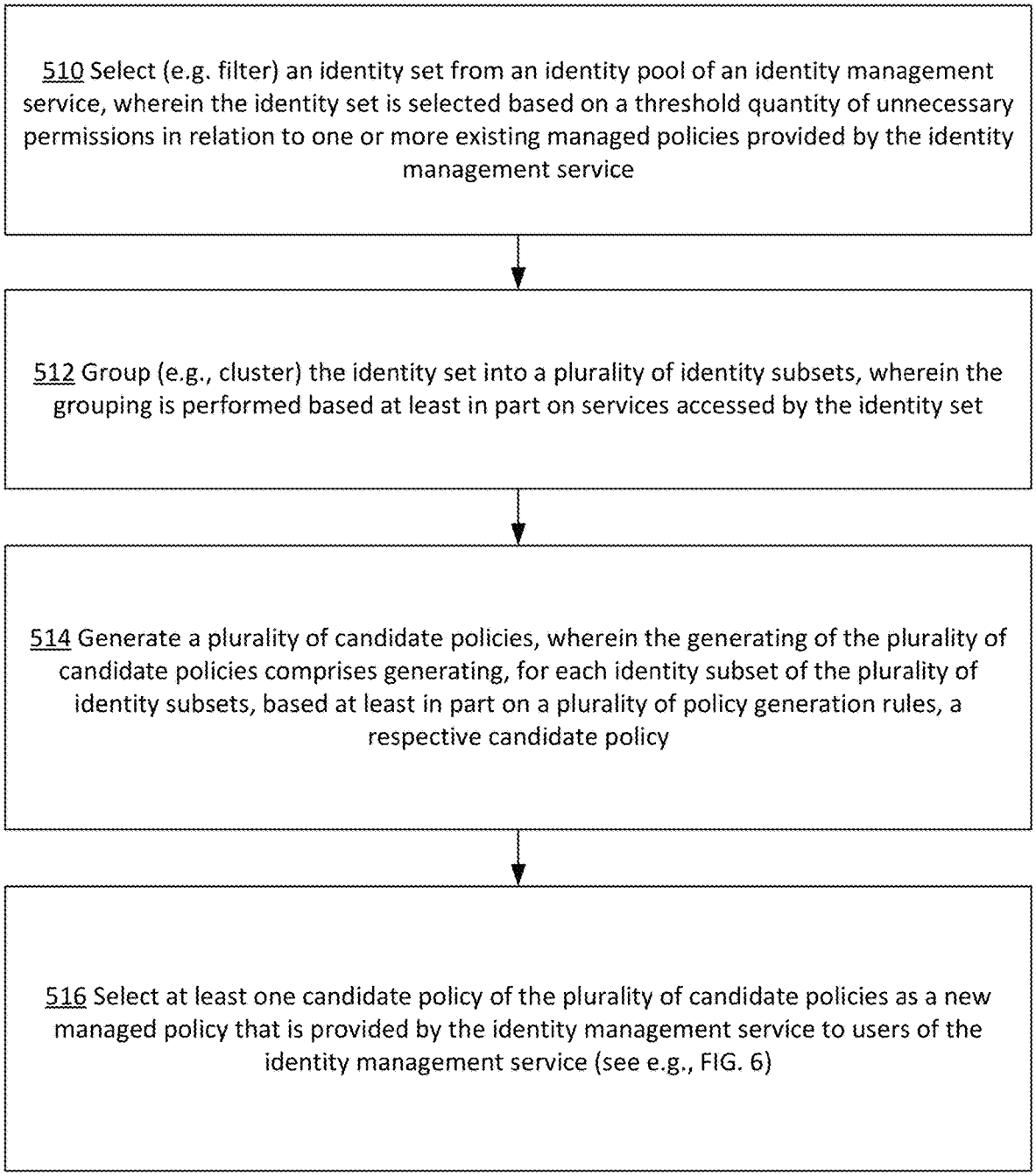
FIG. 5 is a flowchart illustrating an example managed policy generation process that may be used in accordance with the present disclosure.

FIG. 5 is a flowchart illustrating an example managed policy generation process that may be used in accordance with the present disclosure. The process of FIG. 5 is initiated at operation 510, at which an identity set is selected from an identity pool of an identity management service, wherein the identity set is selected based on a threshold quantity of unnecessary permissions in relation to one or more existing managed policies provided by the identity management service. For example, the identity set may include only identities in the identity pool that have greater than a threshold quantity of unnecessary permissions in relation to each individual existing managed policy provided by the identity management service. As shown in FIG. 1, global identity pool 100 is an identity pool of identity management service 170, and filtered identity set 111 is an identity set of identity management service 170. Operation 510 may include determining each identity in the global identity pool 100 that would have greater than a threshold quantity of unnecessary permissions if any one of the existing managed policies 151 was individually attached to the identity. Identities that meet these criteria may be included in the filtered identity set 111, while the remaining identities (i.e., identities that do not meet these criteria) may be filtered out into filtered-out identities 112. In some examples, in order to perform operation 510, the filtering components 101 may access usage history data 161 to determine the permissions that have been used by each identity in the global identity pool 100. The filtering components 101 may then access managed policy data 163 to determine permissions that are provided by each of the managed policies 151. The filtering components 101 may then use the information to determine how many unnecessary permissions would be provided by each one of the existing managed policies to each identity, and the filtering components 101 may compare these determined quantities to the selected threshold. If, for a given identity, individual attachment of each one of the existing managed policies results in greater than the threshold quantity of unnecessary permissions, then the given identity may be included in the identity set. In one specific example, a threshold quantity of twenty unnecessary permissions may be used.

At operation 512, the identity set of is grouped into a plurality of identity subsets, wherein the grouping is performed based at least in part on services accessed by the identity set. For example, as shown in FIG. 1, filtered identity set 111 is grouped into identity subsets 120A-N. As described above, by grouping filtered identity set 111 into smaller identity subsets 120A-N, the quantity of identities being considered in each of the identity subsets 120A-N is smaller than the quantity of identities in the overall filtered identity set 111. In some examples, the set of identities may be grouped based at least in part on services accessed by the set of identities. Thus, for example, identities that access mostly similar services as one another may be grouped together in a same identity subset. By contrast, identities that access mostly different services from one another may be grouped in separate identity subsets. The grouping operations may be performed based on the usage history data 161, which may indicate services and resources that are used by each of the identities that are being grouped. In some examples, the grouping may be performed by executing a clustering algorithm, such as Latent Drichlet Allocation. Also, in some examples, the clustering algorithm may estimate a probability that each service of a plurality of services and each identity of the identity set is associated with each cluster of a plurality of clusters.

At operation 514, a plurality of candidate policies are generated, wherein the generating of the plurality of candidate policies comprises generating, for each identity subset of the plurality of identity subsets, based at least in part on a plurality of policy generation rules, a respective candidate policy. For example, as shown in FIG. 1, a plurality of candidate policies, including policies 130A-N are generated. Specifically, policy 130A is a respective candidate policy for identity subset 120A. Policy 130B is a respective candidate policy for identity subset 120B. Policy 130N is a respective candidate policy for identity subset 120N. The plurality of policy generation rules may include a first rule that a given identity is a covered identity for a given policy only if the given policy includes all services that have been used by the given identity. Additionally, the plurality of policy generation rules may include a second rule that the respective candidate policy will maximize a quantity of covered identities for a respective identity subset. Furthermore, the plurality of policy generation rules may include a third rule that the respective candidate policy cannot exceed a threshold number of services to which to allow access. For example, as shown in constraint 305 of FIG. 3, a threshold of ten policies may be selected, such that each candidate policy of the plurality of candidate policies may be limited to no more than ten services. Other threshold quantities may also be employed. In some cases, the candidate policies that satisfy these rules may be determined using linear programming calculations. As described above, in some examples, generated candidate policies may be approximations of the policies that allow the greatest reduction of unnecessary permissions for the respective identity subsets.

At operation 516, at least one candidate policy of the plurality of candidate policies is selected as a new managed policy that is provided by the identity management service to users of the identity management service. For example, as shown in FIG. 1, policies 130A and 130B are selected as new managed policies 152. By contrast, policy 130N is not selected to be a managed policy. In some examples, the selecting of the at least one candidate policy at operation 516 may include selecting each candidate policy of the plurality of candidate policies that satisfies a set of criteria. The set of criteria may include an affected identity percentage (AIP) criterion that a calculated AIP for a given candidate policy must exceed a threshold AIP. Additionally, the set of criteria may include a reduced unnecessary permission quantity (RUPQ) criterion that a calculated RUPQ for given candidate policy must exceed a threshold RUPQ. It is noted that, while the flowchart of FIG. 5 covers an example scenario in which at least one of the candidate policies is selected as a new managed policy, it is not required that at least one new managed policy will be created from every group of candidate policies. For example, in some cases, if every candidate policy fails the above described selection criteria, then none of the candidate policies may be selected as new managed policies.

Figure 6:
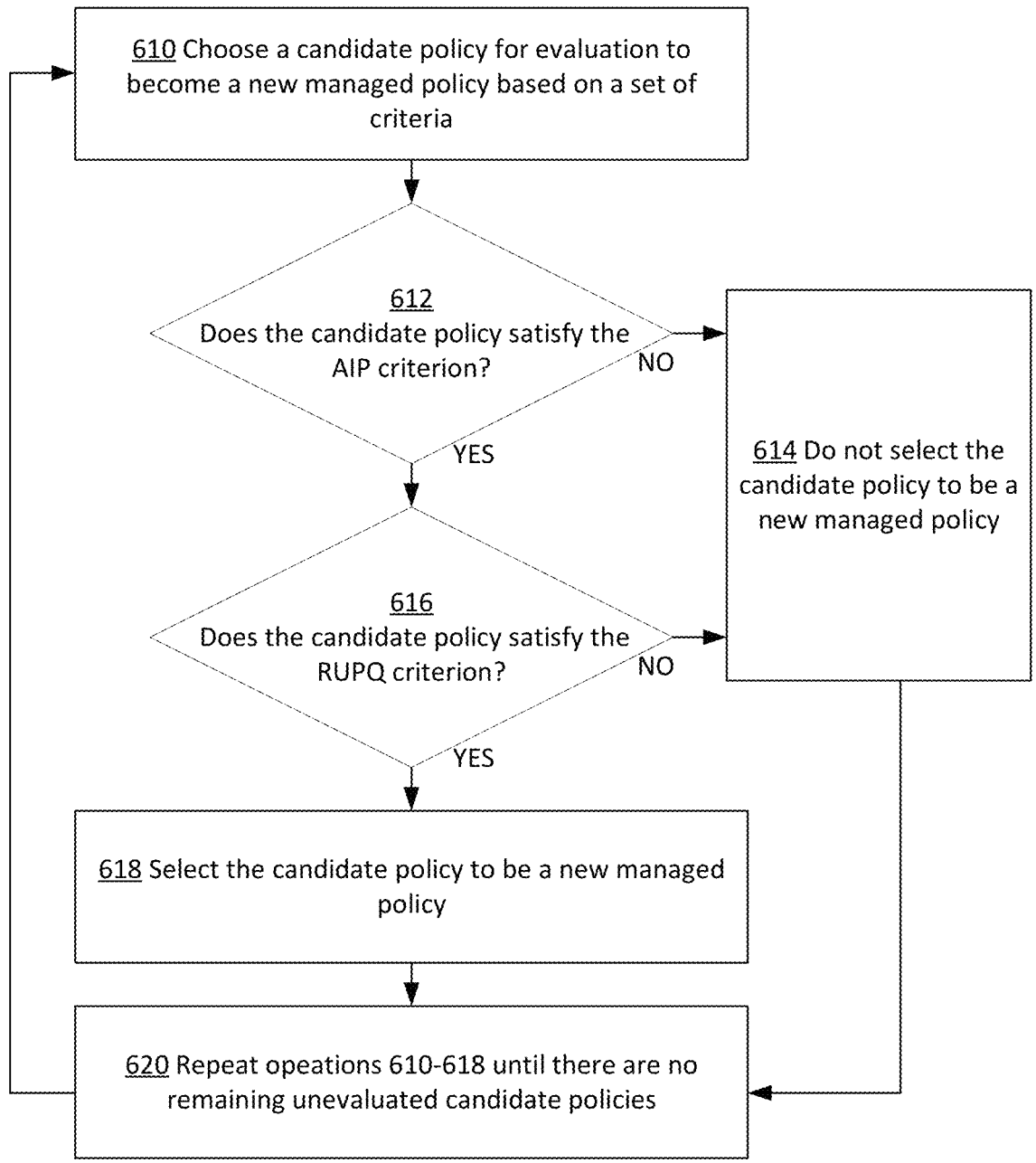
FIG. 6 is a flowchart illustrating an example managed policy selection process that may be used in accordance with the present disclosure.

FIG. 6 is a flowchart illustrating an example managed policy selection process that may be used in accordance with the present disclosure. In some examples, the process of FIG. 6 may be executed in order to perform the selection of the one or more managed policies at operation 516 of FIG. 5. The process of FIG. 6 is initiated at operation 610, at which a candidate policy may be chosen for evaluation to become a new managed policy based on a set of criteria, such as policy selection criteria 400 of FIG. 4. At operation 612, is it determined whether the candidate policy satisfies the AIP criterion. As described above, in some examples, a calculated AIP may be determined, which is a percentage of identities within the global identity pool that are affected identities for the candidate policy. Also, in some examples, the AIP criterion may be that, for a given candidate policy, the calculated AIP must exceed the threshold AIP. In some examples, the threshold AIP may be selected based on an AIP of one or more existing managed policies, such as to exceed the AIP of the existing managed policies. If the candidate policy does not satisfy the AIP criterion, then at operation 614, the candidate policy is not selected to be a new managed policy. By contrast, if the candidate policy satisfies the AIP criterion, then the process proceeds to operation 616.

At operation 616, is it determined whether the candidate policy satisfies the RUPQ criterion. As described above, in some examples, a calculated RUPQ may be determined, which is a quantity (e.g., an average quantity or total quantity) of reduced unnecessary permissions for the affected identities for a given candidate policy. Also, in some examples, the RUPQ criterion may be that, for a given candidate policy, the calculated RUPQ must exceed the threshold RUPQ. In some examples, the threshold RUPQ may be selected based on an RUPQ of one or more existing managed policies, such as to exceed the RUPQ of the existing managed policies. If the candidate policy does not satisfy the RUPQ criterion, then, at operation 614, the candidate policy is not selected to be a new managed policy. By contrast, if the candidate policy satisfies the RUPQ criterion, then the process proceeds to operation 618, at which the candidate policy is selected to be a new managed policy. At operation 620, the operations 610-618 are repeated until there are no remaining unevaluated candidate policies. In some examples, by ensuring that candidate policies that are incorporated into the managed policies meet the policy selection criteria, the candidate policy selection process may ensure that the new managed policies are limited to only those candidate policies that meet selected benchmarks.

Figure 7:
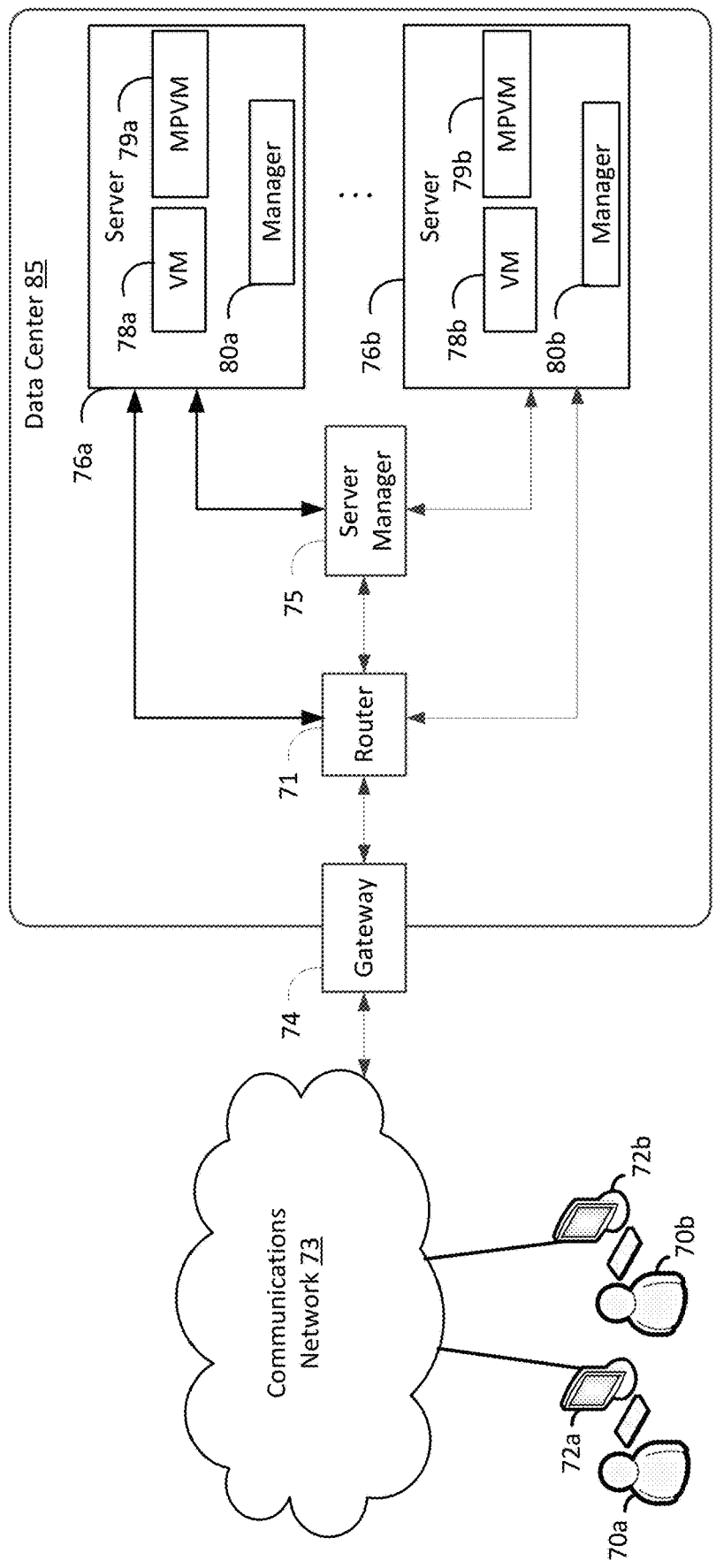
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources-consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include managed policy virtual machines (MPVM's) 79a-b, which are virtual machines that are configured to execute any, or all, of the data-based managed policy generation techniques described herein, such as to create new managed policies for an identity management service as described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
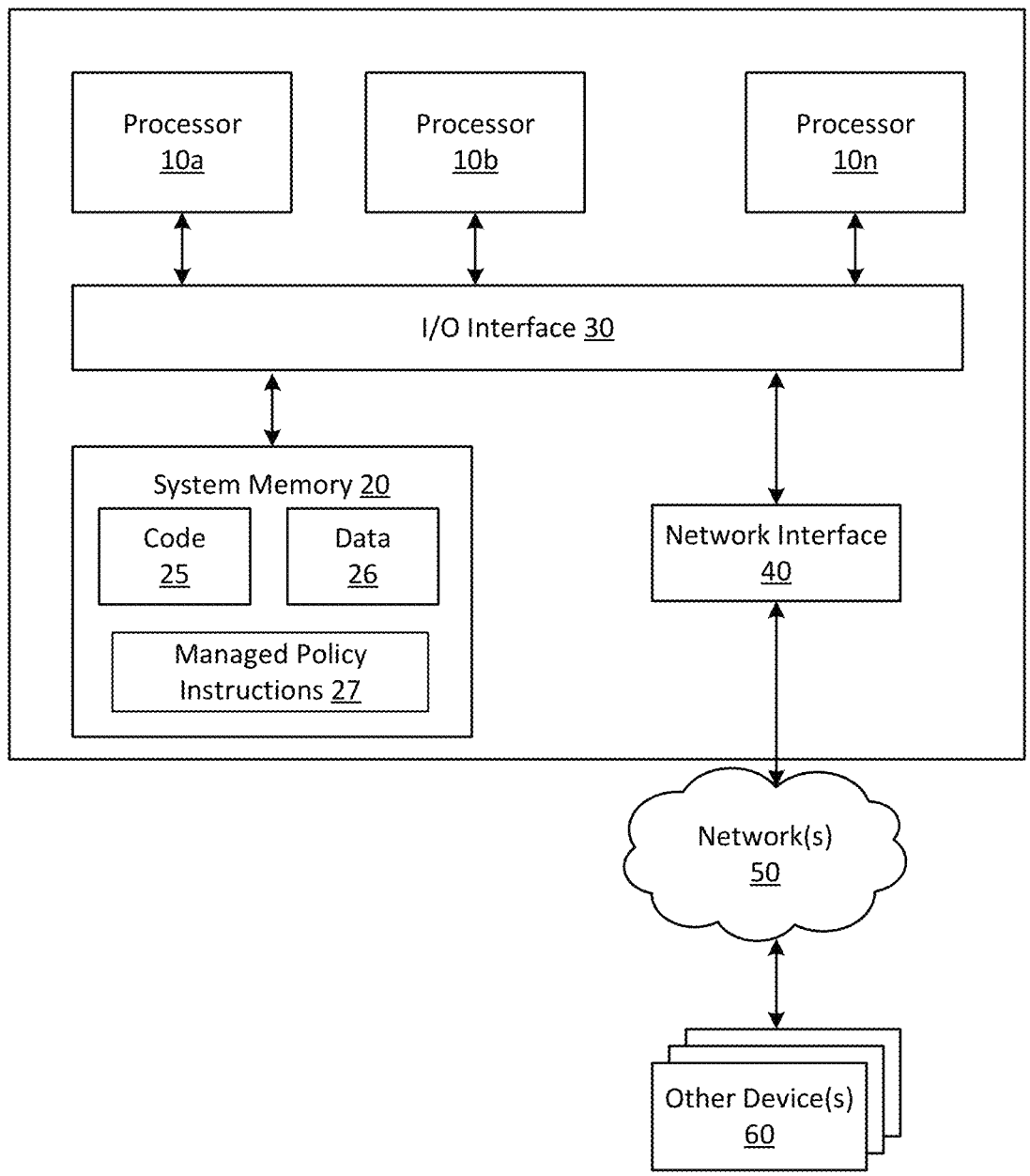
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes managed policy instructions 27, which are instructions for executing any, or all, of the data-based managed policy generation techniques described herein, such as to create new managed policies for an identity management service as described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10).

In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations: in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms: furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform operations comprising:
selecting an identity set from an identity pool of an identity management service, wherein the identity set includes only identities in the identity pool that have greater than a threshold quantity of unnecessary permissions in relation to each individual existing managed policy provided by the identity management service;
clustering the identity set into a plurality of identity clusters, wherein the clustering is performed based at least in part on a plurality of services accessed by the identity set, and wherein the clustering comprises executing a clustering algorithm that estimates a probability that each service of the plurality of services and each identity of the identity set is associated with each identity cluster of the plurality of identity clusters;
generating a plurality of candidate policies, wherein the generating of the plurality of candidate policies comprises generating, for each identity cluster of the plurality of identity clusters, based at least in part on a plurality of policy generation rules, a respective candidate policy; and
selecting at least one candidate policy of the plurality of candidate policies as a new managed policy that is provided by the identity management service to users of the identity management service.

2. The computing system of claim 1, wherein the plurality of policy generation rules comprise a first rule that a given identity is a covered identity for a given policy only if the given policy includes all services that have been used by the given identity.

3. The computing system of claim 2, wherein the plurality of policy generation rules comprise a second rule that the respective candidate policy will maximize a quantity of covered identities for a respective identity cluster.

4. The computing system of claim 3, wherein the plurality of policy generation rules comprise a third rule that the respective candidate policy cannot exceed a threshold number of services to which to allow access.

5. A computer-implemented method comprising:
selecting an identity set from an identity pool of an identity management service, wherein the identity set is selected based on a threshold quantity of unnecessary permissions in relation to one or more existing managed policies provided by the identity management service;
grouping the identity set into a plurality of identity subsets, wherein the grouping is performed based at least in part on a plurality of services accessed by the identity set, and wherein the grouping comprises executing a clustering algorithm that estimates a probability that each service of the plurality of services and each identity of the identity set is associated with each cluster of a plurality of clusters;
generating a plurality of candidate policies, wherein the generating of the plurality of candidate policies comprises generating, for each identity subset of the plurality of identity subsets, based at least in part on a plurality of policy generation rules, a respective candidate policy; and
selecting at least one candidate policy of the plurality of candidate policies as a new managed policy that is provided by the identity management service to users of the identity management service.

6. The computer-implemented method of claim 5, wherein the plurality of policy generation rules comprise a first rule that a given identity is a covered identity for a given policy only if the given policy includes all services that have been used by the given identity.

7. The computer-implemented method of claim 6, wherein the plurality of policy generation rules comprise a second rule that the respective candidate policy will maximize a quantity of covered identities for a respective identity subset.

8. The computer-implemented method of claim 7, wherein the plurality of policy generation rules comprise a third rule that the respective candidate policy cannot exceed a threshold number of services to which to allow access.

9. The computer-implemented method of claim 5, wherein the selecting the at least one candidate policy comprises selecting each candidate policy of the plurality of candidate policies that satisfies a set of criteria.

10. The computer-implemented method of claim 9, wherein the set of criteria comprises a criterion that a calculated affected identity percentage for a given candidate policy must exceed a threshold affected identity percentage.

11. The computer-implemented method of claim 9, wherein the set of criteria comprises a criterion that a calculated reduced unnecessary permission quantity for a given candidate policy must exceed a threshold reduced unnecessary permission quantity.

12. One or more non-transitory computer-readable storage media having stored thereon computing instructions that, upon execution by one or more computing devices, cause the one or more computing devices to perform operations comprising:
   selecting an identity set from an identity pool of an identity management service, wherein the identity set is selected based on a threshold quantity of unnecessary permissions in relation to one or more existing managed policies provided by the identity management service;
   grouping the identity set into a plurality of identity subsets, wherein the grouping is performed based at least in part on a plurality of services accessed by the identity set, and wherein the grouping comprises executing a clustering algorithm that estimates a probability that each service of the plurality of services and each identity of the identity set is associated with each cluster of a plurality of clusters;
   generating a plurality of candidate policies, wherein the generating of the plurality of candidate policies comprises generating, for each identity subset of the plurality of identity subsets, based at least in part on a plurality of policy generation rules, a respective candidate policy; and
   selecting at least one candidate policy of the plurality of candidate policies as a new managed policy that is provided by the identity management service to users of the identity management service.

13. The one or more non-transitory computer-readable storage media of claim 12, wherein the plurality of policy generation rules comprise a first rule that a given identity is a covered identity for a given policy only if the given policy includes all services that have been used by the given identity.

14. The one or more non-transitory computer-readable storage media of claim 13, wherein the plurality of policy generation rules comprise a second rule that the respective candidate policy will maximize a quantity of covered identities for a respective identity subset.

15. The one or more non-transitory computer-readable storage media of claim 14, wherein the plurality of policy generation rules comprise a third rule that the respective candidate policy cannot exceed a threshold number of services to which to allow access.

16. The one or more non-transitory computer-readable storage media of claim 12, wherein the selecting the at least one candidate policy comprises selecting each candidate policy of the plurality of candidate policies that satisfies a set of criteria.

17. The one or more non-transitory computer-readable storage media of claim 16, wherein the set of criteria comprises a criterion that a calculated affected identity percentage for a given candidate policy must exceed a threshold affected identity percentage.

18. The one or more non-transitory computer-readable storage media of claim 16, wherein the set of criteria comprises a criterion that a calculated reduced unnecessary permission quantity for a given candidate policy must exceed a threshold reduced unnecessary permission quantity.

* * * * *